United States Patent
Berg et al.

(10) Patent No.: US 12,135,292 B2
(45) Date of Patent: Nov. 5, 2024

(54) DETECTION METHOD FOR DETECTING AN ANALYTE IN A SAMPLE

(71) Applicant: Roche Diabetes Care, Inc., Indianapolis, IN (US)

(72) Inventors: Max Berg, Mannheim (DE); Daniel Sieffert, Mannheim (DE); Volker Tuerck, Berlin (DE); Simon Wetzel, Mannheim (DE); Momme Winkelnkemper, Berlin (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 953 days.

(21) Appl. No.: 17/142,129

(22) Filed: Jan. 5, 2021

(65) Prior Publication Data

US 2021/0131973 A1    May 6, 2021

Related U.S. Application Data (63) Continuation of application No. PCT/EP2019/067815, filed on Jul. 3, 2019.

(30) Foreign Application Priority Data

Jul. 6, 2018   (EP) ..................... 18182167

(51) Int. Cl.
*B01L 3/00* (2006.01)
*B01F 23/00* (2022.01)
(Continued)

(52) U.S. Cl.
CPC .......... *G01N 21/78* (2013.01); *G06T 7/0014* (2013.01); *G06T 7/90* (2017.01);
(Continued)

(58) Field of Classification Search
CPC .......... G01N 21/78; G01N 2021/7759; G01N 2201/0221; G01N 2201/061;
(Continued)

(56) References Cited

U.S. PATENT DOCUMENTS

| 4,373,818 A | 2/1983 | Yamamoto et al. |
| 4,553,848 A | 11/1985 | Roesicke et al. |

(Continued)

FOREIGN PATENT DOCUMENTS

| CA | 2896197 A1 | 8/2014 |
| CN | 105572110 A | 5/2016 |

(Continued)

OTHER PUBLICATIONS

International Search Report and Written Opinion of the International Searching Authority, PCT/EP2019/067815, Oct. 10, 2019, 10 pages.

(Continued)

*Primary Examiner* — Jennifer Wecker
*Assistant Examiner* — Oyeleye Alexander Alabi
(74) *Attorney, Agent, or Firm* — Bose McKinney & Evans LLP (57) ABSTRACT

A method for detecting an analyte in a sample is disclosed. The method includes providing a mobile device having a camera and an illumination source. A test strip having a test field with at least one test chemical for performing an optical detection reaction in the presence of the analyte is provided. The sample is applied to the test field. Several images of a region of the test strip are captured. The region includes at least part of the test field to which sample is applied. The images are captured before and after the sample is applied and with the illumination source turned on and off. The images captured are compared and differences in light intensities are determined. Analyte concentration is deter- (Continued)

mined using the images captured and the determined light intensities.

19 Claims, 5 Drawing Sheets

(51) Int. Cl.

| | | |
|---|---|---|
| *B01F 23/41* | (2022.01) | |
| *B01F 101/23* | (2022.01) | |
| *B23Q 17/24* | (2006.01) | |
| *C07K 14/705* | (2006.01) | |
| *C12M 1/34* | (2006.01) | |
| *C12Q 1/04* | (2006.01) | |
| *C12Q 1/18* | (2006.01) | |
| *C12Q 1/686* | (2018.01) | |
| *G01N 21/3577* | (2014.01) | |
| *G01N 21/359* | (2014.01) | |
| *G01N 21/39* | (2006.01) | |
| *G01N 21/45* | (2006.01) | |
| *G01N 21/64* | (2006.01) | |
| *G01N 21/77* | (2006.01) | |
| *G01N 21/78* | (2006.01) | |
| *G01N 27/414* | (2006.01) | |
| *G01N 30/12* | (2006.01) | |
| *G01N 30/68* | (2006.01) | |
| *G01N 30/70* | (2006.01) | |
| *G01N 30/72* | (2006.01) | |
| *G01N 30/88* | (2006.01) | |
| *G01N 33/00* | (2006.01) | |
| *G01N 33/18* | (2006.01) | |
| *G01N 33/50* | (2006.01) | |
| *G01N 33/53* | (2006.01) | |
| *G01N 33/543* | (2006.01) | |
| *G01N 33/68* | (2006.01) | |
| *G01N 33/74* | (2006.01) | |
| *G01N 35/00* | (2006.01) | |
| *G01N 35/10* | (2006.01) | |
| *G06T 7/00* | (2017.01) | |
| *G06T 7/90* | (2017.01) | |
| *H10K 10/46* | (2023.01) | |
| *H10K 85/00* | (2023.01) | |
| *H10K 85/20* | (2023.01) | |

(52) U.S. Cl.
CPC .............. *G01N 2021/7759* (2013.01); *G01N 2201/0221* (2013.01); *G01N 2201/061* (2013.01); *G06T 2207/10024* (2013.01); *G06T 2207/10152* (2013.01); *G06T 2207/30004* (2013.01)

(58) Field of Classification Search
CPC .. G01N 21/8483; G01N 21/27; G06T 7/0014; G06T 7/90; G06T 2207/10024; G06T 2207/10152; G06T 2207/30004; G06G 7/24

See application file for complete search history.

(56) References Cited

U.S. PATENT DOCUMENTS

| | | |
|---|---|---|
| 6,267,722 B1 | 7/2001 | Anderson et al. |
| 6,574,425 B1 | 6/2003 | Weiss et al. |
| 2005/0054082 A1 | 3/2005 | Pachl et al. |
| 2005/0227370 A1 | 10/2005 | Ramel et al. |
| 2006/0128034 A1 | 6/2006 | Petruno et al. |
| 2006/0222567 A1 | 10/2006 | Kloepfer et al. |
| 2008/0053201 A1 | 3/2008 | Roesicke et al. |
| 2008/0259339 A1 | 10/2008 | Wehowski et al. |
| 2012/0059266 A1 | 3/2012 | Davis et al. |
| 2013/0203043 A1 | 8/2013 | Ozcan et al. |
| 2013/0267032 A1* | 10/2013 | Tsai ..................... G06F 18/22 |
| | | 436/95 |
| 2014/0072189 A1* | 3/2014 | Jena .................... A61B 5/6898 |
| | | 382/128 |
| 2014/0170757 A1 | 6/2014 | Tsai et al. |
| 2015/0233898 A1* | 8/2015 | Chen ................. G01N 21/8483 |
| | | 422/404 |
| 2015/0308961 A1 | 10/2015 | Burg et al. |
| 2015/0369664 A1 | 12/2015 | Garsha et al. |
| 2017/0343480 A1 | 11/2017 | Kwak et al. |

FOREIGN PATENT DOCUMENTS

| | | |
|---|---|---|
| DE | 196 30 160 A1 | 1/1998 |
| DE | 102005033327 A1 | 1/2007 |
| EP | 1 912 058 A1 | 4/2008 |
| EP | 3 108 244 A1 | 12/2016 |
| EP | 3 581 921 A1 | 12/2019 |
| JP | 2005-513498 A | 5/2005 |
| JP | 2007-528005 A | 10/2007 |
| JP | 2008-232662 A | 10/2008 |
| JP | 2012-519864 A | 8/2012 |
| JP | 2014-098645 A | 5/2014 |
| JP | 2015-510118 A | 4/2015 |
| JP | 2015-533211 A | 11/2015 |
| JP | 2016-503880 A | 2/2016 |
| JP | 2017-511466 A | 4/2017 |
| RU | 2 395 092 C2 | 7/2010 |
| RU | 120 556 U1 | 9/2012 |
| WO | WO 2007/009541 A1 | 1/2007 |
| WO | WO 2012/131386 A1 | 10/2012 |
| WO | WO 2015/078954 A1 | 6/2015 |
| WO | WO 2015/120819 A1 | 8/2015 |

OTHER PUBLICATIONS

International Preliminary Report on Patentability, PCT/EP2019/067815, Nov. 6, 2020, 6 pages.

Hönes et al., Diabetes Technology and Therapeutics, vol. 10, Supplement 1, 2008, pp. 10-26.

* cited by examiner

DETECTION METHOD FOR DETECTING AN ANALYTE IN A SAMPLE

RELATED APPLICATIONS

This application is a continuation of PCT/EP2019/067815, filed Jul. 3, 2019, which claims priority to EP 18 182 167.9, filed Jul. 6, 2018, the entire disclosures of both of which are hereby incorporated herein by reference.

BACKGROUND

The present disclosure refers to a detection method for detecting an analyte in a sample. The disclosure further relates to a computer program with program means for performing the method according to the disclosure. Further, the disclosure refers to a mobile device and to a kit. The method, computer program, mobile device and kit according to the present disclosure may be used in medical diagnostics in order to qualitatively and/or quantitatively detect one or more analytes in one or more bodily fluids. Other fields of application of the present disclosure however, are possible.

In the field of medical diagnostics, in many cases, one or more analytes have to be detected in samples of a body fluid, such as blood, interstitial fluid, urine, saliva or other types of body fluids. Examples of analytes to be detected are glucose, triglycerides, lactate, cholesterol or other types of analytes typically present in these body fluids. According to the concentration and/or the presence of the analyte, an appropriate treatment may be chosen, if necessary.

Generally, devices and methods known to the skilled person make use of test elements comprising one or more test chemistries, which, in presence of the analyte to be detected, are capable of performing one or more detectable reactions, such as optically detectable reactions. With regard to these test chemistries, reference may be made, e.g., to J. Hoenes et al.: The Technology Behind Glucose Meters: Test Strips, Diabetes Technology & Therapeutics, Volume 10, Supplement 1, 2008, S-10 to S-26. Other types of test chemistry are possible and may be used for performing the present disclosure.

In analytical measurements, specifically analytical measurements based on color formation reactions, one technical challenge resides in the evaluation of the color change which is due to the detection reaction. Besides using dedicated analytical devices, such as handheld blood glucose meters, the use of generally available electronics such as smart phones and portable computers has become more and more popular over the recent years. WO 2012/131386 A1 discloses a testing apparatus for performing an assay, the testing apparatus comprising: a receptacle containing a reagent, the reagent being reactive to an applied test sample by developing a color or pattern variation; a portable device, e.g., a mobile phone or a laptop, comprising a processor and an image capture device, wherein the processor is configured to process data captured by the image capture device and output a test result for the applied test sample.

WO 2015/078954 A1 discloses a method, an analytical device and an analytical system for determining a concentration of at least one analyte in a bodily fluid. The method comprising: a) applying a sample of the bodily fluid to a test carrier; b) illuminating the test carrier by at least one light source; c) receiving light remitted by the test carrier by using at least one detector; d) determining the concentration of the analyte by evaluating at least one detector signal generated by the detector. The at least one light source is modulated by using at least two modulation frequencies. The detector signal is demodulated with the at least two modulation frequencies in order to generate at least two demodulated detector signals, each demodulated detector signal corresponding to one of the modulation frequencies. The method comprises a fault detection based on a comparison of the at least two demodulated detector signals.

U.S. Publication No 2017/0343480 A1 describes a method for measuring blood glucose levels by a portable terminal using a strip module. The strip module includes a dye pad having a color that changes in response to a sample applied to the dye pad. The strip module also includes a transparent strip having a first side and a second side. The first side is opposite the second side. The dye pad is mounted on the first side of the transparent strip and the transparent strip reflects light provided from a light source of a portable terminal located adjacent to the second side and transmits the light to the dye pad.

U.S. Publication No. 2015/233898 A1 describes a test strip module including a case, a test strip in the case, and a position anchor extending down past a mating surface to a face of a mobile computing device. The positioning anchor has a shape matching a feature on the face of the mobile computing device.

U.S. Pat. No. 6,267,722 B1 describes systems and methods for medical diagnosis or risk assessment for a patient. These systems and methods are designed to be employed at the point of care, such as in emergency rooms and operating rooms, or in any situation in which a rapid and accurate result is desired. The systems and methods process patient data, particularly data from point of care diagnostic tests or assays, including immunoassays, electrocardiograms, X-rays and other such tests, and provide an indication of a medical condition or risk or absence thereof. The systems include an instrument for reading or evaluating the test data and software for converting the data into diagnostic or risk assessment information.

Reliability and accuracy of the analytical measurement using mobile computing devices generally depends on a large number of technical factors. Specifically, a huge number of mobile devices having cameras are available on the market, all having different technical and optical properties which have to be considered for the analytical measurement. For example, measuring physical and biochemical parameters with mobile devices is disclosed in EP 3 108 244 A1 and WO 2015/120819 A1, describing a test strip module including a case, a test strip in the case, and a position anchor extending down past a mating surface to a face of a mobile computing device. The position anchor has a shape matching a feature on the face of the mobile computing device.

In addition, the reliability and accuracy of the analytical measurement using mobile computing devices typically largely depends on illumination and lighting conditions during the measurement. For example, in U.S. Pat. No. 6,574,425 B1, a modulated light source emits light to illuminate a target surface which possesses a certain color and shade of color. Light that is reflected from the target surface is detected by an optical detector. The output from the optical detector is processed and fed back to the optical detector to compensate for any shift caused by ambient light, temperature or other external factors, and is differentially amplified to generate an output signal indicative of the color and shade of the target surface. The output signal from the differential amplifier is then demodulated by a synchronous detector to produce a substantially steady DC voltage that is indicative of the color or shade of color at the target surface. Where the target surface color shade is indicative of a certain measurable quantity or quality (such as an analyte concentration), the steady DC voltage is converted using a look-up table or mathematical formula into a corresponding quantity or quality measurement. In performing this conversion, compensation is made for any variations in modulated light source intensity due to temperature change.

U.S. Pat. No. 4,553,848 A discloses a method and device for detecting and evaluating the optical properties of a specimen, utilizing a light source that has alternating light and dark phases, a detector that picks up light from the light source by way of the specimen being examined, and a circuit that integrates and digitalizes the signals received from the detector, that includes an integrator, and that can be connected to the detector. The signals emitted from the detector are integrated both during at least part of the light phase and during at least part of the dark phase. The integral obtained during the dark phase is subtracted from that obtained during the light phase in order to determine the results. The integrator that is used to integrate the signals is used like an analog-to-digital converter of the double-integration type to convert the integral into a digital signal. To achieve maximum precision and simplicity in the integration and digitalization phase, each part of the light or dark phase is followed by a measurement-voltage period during which the signals coming from the detector are applied in sequence and with opposite mathematical signs to a single integrator. Integration is carried out over a whole number of measurement-voltage periods to form a total integral.

EP 1912 058 A1 discloses an apparatus and method for detecting and evaluating optical signals. The arrangement has a mixer unit producing a light control signal from two different control signals (AN1, AN2), and a light source controlled by the light control signal. A signal source produces one of the control signals with frequency and intensity. A measuring signal and the control signal are supplied to a frequency-selective amplifier. Output signals (A1, A2) are supplied to an evaluation unit, which compares the output signals. An extraneous light determines information about an interference of the measurement from the result of comparison. Also included is a method for detecting and analyzing an optical signal to detect an analyte in an analysis fluid.

Despite the advantages involved in using a mobile computing device for the purpose of performing an analytical measurement, several technical challenges remain. Specifically, reliability and accuracy of the measurements need to be enhanced and ensured. A major difficulty is the presence and impact of ambient light. Reliability and accuracy of the analytical measurement may significantly depend on lighting conditions during capturing of images of a test strip for analytical measurement when using the camera of a mobile phone. Specifically, ambient light may have a significant impact on the lighting conditions, for example, due to various illumination means being present at different specific locations and/or depending where the image is captured and at which day or night time the image is captured. Particularly, ambient light may interfere with evaluation of the color formed on a reagent field of a test strip.

SUMMARY

It is therefore desirable to provide methods and devices which address the above mentioned technical challenges of analytical measurements using mobile devices such as consumer-electronics mobile devices, specifically multipurpose mobile devices which are not dedicated to analytical measurements, such as smart phones or tablet computers. Specifically, methods and devices are disclosed which ensure reliability and accuracy of the measurements.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, notwithstanding the fact that the respective feature or element may be present once or more than once. It shall also be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "sample," "camera," "illumination source" and "test field," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect, a detection method for detecting at least one analyte in at least one sample is disclosed. The method comprises the following steps which, as an example, may be performed in the given order. It shall be noted, however, that a different order is also possible. Further, it is possible to perform one or more of the method steps once or repeatedly. Further, it is also possible to perform two or more of the method steps simultaneously or in a timely overlapping fashion. The method may further comprise steps which are not listed.

The detection method comprises the following steps:
a) providing at least one mobile device having at least one camera and at least one illumination source;
b) providing at least one test strip having at least one test field, the test field comprising at least one test chemical for performing an optical detection reaction in the presence of the analyte;
c) applying the at least one sample to the test field;
d) capturing a plurality of images of at least one region of the test strip, the region comprising at least a part of the test field to which the sample is applied, comprising
   d1) capturing at least one image before applying the sample to the test field, with the illumination source turned off,
   d2) capturing at least one image before applying the sample to the test field, with the illumination source turned on; and
   d3) capturing at least one image after applying the sample to the test field;
e) determining a concentration of the analyte in the sample by using the images captured in step d).

The term "detecting an analyte in a sample" as used herein is a broad term and is to be given its ordinary and customary meaning to a person of ordinary skill in the art and is not to be limited to a special or customized meaning. The term specifically may refer, without limitation, to a quantitative and/or qualitative determination of at least one analyte in an arbitrary sample. For example, the sample may comprise a body fluid, such as blood, interstitial fluid, urine, saliva or other types of body fluids. The result of the analytical measurement, as an example, may be a concentration of the analyte and/or the presence or absence of the analyte to be determined. Specifically, as an example, the analytical measurement may be a blood glucose measurement, thus the result of the analytical measurement may, for example, be a blood glucose concentration.

For example, in step a), a mobile device having at least one camera and at least one illumination source may be provided. The term "mobile device" as used herein is a broad term and is to be given its ordinary and customary meaning to a person of ordinary skill in the art and is not to be limited to a special or customized meaning. The term specifically may refer, without limitation, to a mobile electronics device, more specifically to a mobile communication device such as a cell phone or a smartphone. Additionally or alternatively, as will be outlined in further detail below, the mobile device may also refer to a tablet computer, a laptop or any other type of portable computer having at least one camera and at least one illumination source.

The term "camera" as used herein is a broad term and is to be given its ordinary and customary meaning to a person of ordinary skill in the art and is not to be limited to a special or customized meaning. The term specifically may refer, without limitation, to a device having at least one imaging element configured for recording or capturing spatially resolved one-dimensional, two-dimensional or even three-dimensional optical information. As an example, the camera may comprise at least one camera chip, such as at least one CCD chip and/or at least one CMOS chip configured for recording images. For example, the camera may be a color camera comprising at least three color pixels. The camera may be a color CMOS camera. For example, the camera may comprise black and white pixels and color pixels. The color pixels and the black and white pixels may be combined internally in the camera. The camera may comprise at least one color camera and at least one black and white camera, such as a black and white CMOS. The camera may comprise at least one black and white CMOS chip. The camera generally may comprise a one-dimensional or two-dimensional array of image sensors, such as pixels. As an example, the camera may comprise at least 10 pixels in at least one dimension, such as at least 10 pixels in each dimension. It shall be noted, however, that other cameras are also feasible. The camera may be a camera of a mobile communications device. The disclosure specifically shall be applicable to cameras as usually used in mobile applications such as notebook computers, tablets or, specifically, cell phones such as smart phones. Thus, specifically, the camera may be part of a mobile device which, besides the at least one camera, comprises one or more data processing devices such as one or more data processors. Other cameras, however, are feasible. The camera, besides at least one camera chip or imaging chip, may comprise further elements, such as one or more optical elements, e.g., one or more lenses. As an example, the camera may be a fix-focus camera, having at least one lens which is fixedly adjusted with respect to the camera. Alternatively, however, the camera may also comprise one or more variable lenses which may be adjusted automatically or manually.

The camera specifically may be a color camera. Thus, such as for each pixel, color information may be provided or generated, such as color values for three colors R, G, B. A larger number of color values is also feasible, such as four colors for each pixel. Color cameras are generally known to the skilled person. Thus, as an example, each pixel of the camera chip may have three or more different color sensors, such as color recording pixels like one pixel for red (R), one pixel for green (G) and one pixel for blue (B). For each of the pixels, such as for R, G, B, values may be recorded by the pixels, such as digital values in the range of 0 to 255, depending on the intensity of the respective color. Instead of using color triples such as R, G, B, as an example, quadruples may be used, such as C, M, Y, K or the like.

As used herein, the term "the illumination source of the mobile device" refers to an arbitrary light source of the mobile device. The term "illumination source" refers to at least one device adapted to generate light for illuminating an object. As used herein, the term "light" generally refers to electromagnetic radiation in one or more of the visible spectral range, the ultraviolet spectral range and the infrared spectral range. The term "visible spectral range" generally refers to a spectral range of 380 nm to 780 nm. Preferably, light as used within the present disclosure is light in the visual spectral range. The illumination source may comprise at least one light-emitting diode integrated in the mobile device. In particular, the illumination source may be a backlighting of the mobile device, in particular of the mobile phone. The mobile device may comprise further illumination devices such as at least one illumination source illuminating the display and/or the display may be designed as further illumination source itself.

The illumination source may have two states, an on-state in which it generates light beam for illuminating the test strip and an off-state in which the illumination source is off. As used herein, the term "is turned on" refers to that the illumination source is activated and/or switched on to illuminate the test strip. The term "is turned off" refers to that the illumination source is within an off-state or is actively switched off. As outlined above, in step d1), at least one image is captured wherein the illumination source of the mobile device is turned off. This may allow capturing an image comprising light intensities of ambient light sources only and independent from illumination provided by the illumination source of the mobile device. In step d2) the illumination source is turned on, such that it may be possible to capture the second image comprising illumination intensities from both ambient light and from the illumination by the illumination source of the mobile device.

The illumination source may comprise at least one light-emitting diode (LED) integrated in the mobile device. The illumination source may comprise at least one white light LED. The white light LED may be controlled using a short current pulse such that the white light LED may be adapted to generate a bright flash of light. The illumination source may be adapted to illuminate the test strip all the time during capturing of the image. In contrast to electron flashes, flash duration of the white light LED may take several 100 ms, this may allow that the illumination source illuminates the test strip all the time during capturing of the image in a flash-mode of the LED. Alternatively, the LED may be adapted to be permanently illuminating the test strip in a non-flash mode.

In step b), at least one test strip having at least one test field may be provided. As used herein, the term "test strip" is a broad term and is to be given its ordinary and customary meaning to a person of ordinary skill in the art and is not to be limited to a special or customized meaning. The term specifically may refer, without limitation, to an arbitrary element or device configured for performing a color-change detection reaction. The test strip may particularly have a test field comprising at least one test chemical for performing an optical detection reaction in the presence of the analyte in order to detect the at least one analyte. The test element, as an example, may comprise at least one substrate, such as at least one carrier, with the at least one test field applied thereto or integrated therein. As an example, the at least one carrier may be strip-shaped, thereby rendering the test element a test strip. These test strips are generally widely in use and available. One test strip may carry a single test field or a plurality of test fields having identical or different test chemicals comprised therein. The test strip may have at least one sample applied thereto. In particular, the test strip may be a top-dosing test strip, such as a test strip configured for having the at least one sample applied thereto on a second side and further configured for performing the color-change detection reaction such that the color-change can be identified on a first side of the test strip, specifically the first side being arranged opposing the second side of the test strip.

The term "test field" as used herein is a broad term and is to be given its ordinary and customary meaning to a person of ordinary skill in the art and is not to be limited to a special or customized meaning. The term specifically may refer, without limitation, to a coherent amount of the test chemical, such as to a field, e.g., a field of round, polygonal or rectangular shape, having one or more layers of material, with at least one layer of the test field having the test chemical comprised therein. Other layers may be present providing specific optical properties such as reflective properties, providing spreading properties for spreading the sample or providing separation properties such as for separating of particulate components of the sample, such as cellular components.

The term "test chemical" as used herein is a broad term and is to be given its ordinary and customary meaning to a person of ordinary skill in the art and is not to be limited to a special or customized meaning. The term specifically may refer, without limitation, to a chemical compound or a plurality of chemical compounds such as a mixture of chemical compounds suited for performing a detection reaction in the presence of the analyte, wherein the detection reaction is detectable by specific means, such as optically. The detection reaction specifically may be analyte-specific. The test chemical, in the present case, specifically may be an optical test chemical, such as a color-change test chemical which changes in color in the presence of the analyte. The color change specifically may depend on the amount of analyte present in the sample. The test chemical, as an example, may comprise at least one enzyme, such as glucose oxidase and/or glucose dehydrogenase. Additionally, other components may be present, such as one or more dyes, mediators and the like. Test chemicals are generally known to the skilled person and reference may be made to J. Hoenes, et al.: Diabetes Technology and Therapeutics, Vol. 10, Supplement 1, 2008, pp. 10-26. Other test chemicals, however, are feasible, too.

The term "analyte" as used herein is a broad term and is to be given its ordinary and customary meaning to a person of ordinary skill in the art and is not to be limited to a special or customized meaning. The term specifically may refer, without limitation, to one or more specific chemical compounds and/or other parameters to be detected and/or measured. As an example, the at least one analyte may be a chemical compound which takes part in metabolism, such as one or more of glucose, cholesterol or triglycerides. Additionally or alternatively, other types of analytes or parameters may be determined, e.g., a pH value.

As used herein, without limitation, the term "image" specifically may relate to data recorded by using a camera, such as a plurality of electronic readings from an imaging device, such as the pixels of the camera chip. The image itself, thus, may comprise pixels, the pixels of the image correlating to pixels of the camera chip. Consequently, when referring to "pixels," reference is either made to the units of image information generated by the single pixels of the camera chip or to the single pixels of the camera chip directly. The image may comprise raw pixel data. For example, the image may comprise data in the RGGB space, single color data from one of R, G or B pixels, a Bayer pattern image or the like. The image may comprise evaluated pixel data such as a full-color image or an RGB image. The raw pixel data may be evaluated for example by using demosaicing algorithms and/or filtering algorithms. These techniques are generally known to the skilled person.

The term "capturing at least one image" refers to one or more of imaging, image recording, image acquisition, image capturing. The term "capturing at least one image" may comprise capturing a single image and/or a plurality of images such as a sequence of images. The capturing of the at least one image may be initiated by the user action or may automatically be initiated, e.g., once the presence of the at least one object within a field of view and/or within a predetermined sector of the field of view of the camera is automatically detected. These automatic image acquisition techniques are known in the field of automatic barcode readers, such as for example from automatic barcode reading apps.

For example, in step d) a plurality of images of at least one region of the test strip may be captured. The at least one region of the test strip may comprise at least part of the test field to which the sample may be applied. In particular, as outlined above, the images captured in step d) may for example be used for determining the concentration of the analyte in the sample in step e).

In addition, the detection method may further comprise step f) of comparing corresponding images captured in step d) with the illumination source turned on and off, and determining a difference in light intensities. Specifically, the term "corresponding images" may refer, without limitation, to at least two images of an object, such as the test strip, wherein one of the at least two images is captured with the illumination source turned on and wherein the other one of the at least two images is captured with the illumination source turned off, preferably with the other conditions of the situation unchanged. As an example, the at least one image captured in step d1) may be compared with the at least one image captured in step d2). Additionally or alternatively, the at least one image captured in step d3) may for example be compared with one of the images captured in step d1) and/or step d2). In particular, step f) may comprise determining information on the differences in light intensities between corresponding images captured in step d).

Further, step e) may for example comprise using the result of step f) for determining the concentration of the analyte in the sample. Specifically, the differences in light intensities determined in step f) may be used for determining the concentration of the analyte in the sample. Thus, the information on the differences in light intensities may for example be taken into account when determining the concentration of the analyte in the sample.

Further, step f) may, for example, comprise:
f1) deriving at least one item of color information of the part of the test field to which the sample is applied for each image to be compared;
f2) transforming the item of color information into at least one item of the light intensity information by using at least one camera-specific transmission function; and
f3) determining the differences in light intensities by using the items of light intensity information of corresponding images with the illumination source turned on and off.

The term "item of color information" as used herein is a broad term and is to be given its ordinary and customary meaning to a person of ordinary skill in the art and is not to be limited to a special or customized meaning. The term specifically may refer, without limitation, to an indication or information regarding the color of an arbitrary object, such as, for example in the present case, of the color of at least the part of the test field to which the sample may be applied. As an example, the item of color information may indicate the color of the part of the test field by using coordinates for describing the color in an arbitrary color coordinate system. Thus, the at least one item of color information, specifically, may imply at least one item of photometric information, indicating a light intensity of illumination, weighted with one or more spectral sensitivity functions, such as one or more spectral sensitivity functions determined by the spectral sensitivity of the camera or a component thereof, e.g., a camera chip and/or one or more spectral filters, e.g., R, G, B filters. Several color coordinate systems are generally known to the skilled person and may also be used in the context of the present disclosure. In particular, the item of color information may comprise information on one, more than one or even all of the color coordinates of several or even all of the pixels of at least one image showing at least the part of the test field to which the sample may be applied. The item of color information, as an example, may be digital information. In particular, the item of color information may be or may comprise, for example, at least one digital value in the range of 0 to 255 for one or more color coordinates, such as, for example, for one or more of R, G and B.

As an example, the item of color information may in particular comprise information on an intensity, specifically in case only one color coordinate is evaluated. Thus, as an example, specifically in case one color coordinate is considered and/or evaluated, the color information may be or may comprise a value of a color channel or color coordinate, wherein, as an example, a high value also may correspond to a high intensity, and a low value may correspond to a low intensity. In general, a change of color may also be accompanied by a change of intensity. Specifically, in this case, steps f1) and f2), listed above, do not necessarily have to be separate method steps. Thus, steps f1) and f2), at least partially, may be combined.

In a simple case, as an example, the item of color information may be or may comprise the value for a color coordinate which is known to undergo a most significant or profound change during the color-change or color formation reaction of the test chemical. As an example, in case a specific test chemical is known to change its hue most profoundly in the blue spectral range during the color-change reaction used for detecting the analyte, a blue color coordinate may be used, and the item of color information may be or may comprise the values of the blue color coordinate determined for all of the pixels or for at least a group of the pixels of at least the part of the test field within the image to which the sample may be applied.

As indicated above, the item of color information may be transformed into at least one item of the light intensity information, in substep f2), by using the at least one camera-specific transmission function. As used herein, the term "item of light intensity information" is a broad term and is to be given its ordinary and customary meaning to a person of ordinary skill in the art and is not to be limited to a special or customized meaning. The term specifically may refer, without limitation, to an indication of information regarding the light intensity, specifically the intensity of illumination or exposure level, of an arbitrary object, such as for example in the present case of at least the part of the test field to which the sample may be applied. As an example, the item of light intensity information may indicate the light intensity of the part of the test field in terms of an exposure value (EV), such as an exposure level. The at least one item of light intensity information, specifically, may imply at least one item of information indicating a radiometric power of the illumination per unit area, such as in $W/m^2$ or similar units. In particular, the item of light intensity information may be derived by using the at least one camera-specific transmission function.

The term "camera-specific transmission function" as used herein is a broad term and is to be given its ordinary and customary meaning to a person of ordinary skill in the art and is not to be limited to a special or customized meaning. The term specifically may refer, without limitation, to a mathematical operation for describing an arbitrary action or behavior of the camera when transferring illumination or light intensity from at least one object, specifically of at least part of the test field to which the sample may be applied, into color information, such as into at least one item of color information. The camera-specific transmission function may particularly be dependent on technical features of the camera, such as on the imaging chip or one or more sensors, the data processing device, such as the processor, the optical elements, such as the one or more lenses, or any other technical features of the camera.

The camera-specific transmission function, for example, may be determined by empirical or semi-empirical means and, as an example, may be predetermined or may be determined by one or more calibration processes, which may also be part of the method. Thus, as an example, the camera-specific transmission function may fully or partially be determined by using one or more reference fields with known color coordinates or known color properties. For determining the camera-specific transmission function, the one or more reference fields, as an example, may be illuminated under one or more known illumination conditions, e.g., with known intensity or intensities, and color information, such as at least one item of color information, may be measured by using the camera. Thereby, a relationship between the at least one item of color information and the intensity may be determined. The camera-specific transmission function may, e.g., be determined or stored by using one or more of a curve, a graph, an analytical transformation function, a table, a matrix or any other means indicating a value of the intensity for a specific item of color information or vice versa. The camera-specific transmission function, as an example, may be stored in a data storage device, such as a volatile or non-volatile data storage device. The camera-specific transmission function, as an example, may be predetermined for a specific type of camera. Thus, as an example, a plurality of camera-specific transmission functions may be predetermined, e.g., for a plurality of specific mobile devices, and the method may imply selecting an appropriate camera-specific transmission function from the plurality of camera-specific transmission functions in accordance with the type of mobile device.

Further, for step e), differences in light intensities may be transformed into differences in items of color information for corresponding images. In particular, the differences in light intensities may be transformed into the differences in items of color information for corresponding images by using an inverted function of the camera-specific transmission function.

In particular, the camera-specific transformation function may be a non-linear function. The camera-specific transformation function may, as an example, allow transforming light intensity, for example measured in exposure value (EV), into color information, such as into an RGB value. Thus, the camera-specific transformation function may for example be a non-linear light intensity transmission function. Additionally or alternatively, the camera-specific transformation function may, as an example, allow transforming light intensity or exposure level, e.g., measured in exposure value (EV), into color information, such as into JPEG brightness. Thus, the camera-specific transformation function may for example be a non-linear exposure level sensitivity function. In particular, the camera-specific transformation function may for example be one or more of a non-linear light intensity transmission function and a non-linear exposure level sensitivity function.

Further, the substep or step d3) may comprise at least two further substeps. In particular, d3) may comprise:
  d3i) capturing at least one image with the illumination source turned off; and
  d3ii) capturing at least one image with the illumination source turned on.

In particular, step e) may further comprise using a difference in light intensities between the images captured in d3i) and d3ii). Thus, step e) of the detection method may additionally comprise using the difference in light intensities between the images captured in d3i) and d3ii) for determining the concentration of the analyte in the sample.

Further, one or more of steps d1) to d3) may be performed repeatedly. In particular, performing one or more of steps d1), d2) and/or d3) repeatedly, may, for example, allow monitoring a kinetic measurement curve of the optical detection reaction. Thus, the detection method may further comprise monitoring a kinetic measurement curve of the optical detection reaction.

In step c) of the detection method, the sample may specifically be applied to the test field from a side opposing the camera. The test strip, specifically the top-dosing test strip, may be positioned relative to the camera such that one side of the test field may face the camera, wherein another side of the test field may be averted or facing away from the camera. In particular, the sample may be applied to the side of the test field opposing or being averted from the camera.

Specifically, a holder may be used for positioning the test strip relative to the mobile device. In particular, the test strip may be positioned with the test field at a distance from the camera, in particular from the camera of the mobile device. As an example, the mobile device may be arranged such that the camera may face in a first direction, e.g., in an upwards direction, specifically facing a first side of the test field and the sample may be applied to a second side of the test field opposing the first side. Thus, the detection method may comprise using the holder for positioning the test strip relative to the mobile device, wherein the test strip may be positioned with the test field at a distance from the camera, wherein the camera may be on the first side of the test field and wherein the sample may be applied from the second side opposing the first side.

The holder may, specifically, be open towards the second side, such that the test field may be uncovered on the second side. In particular, the holder may not cover the test field on the second side such that the holder may not interfere or be in the way when applying the sample to the second side of the test field. In addition, the holder may comprise an opening, such that the test field may also be uncovered on the first side.

Further, the test field may for example be at least partially translucent. In particular, in step e) of the detection method, a contribution of ambient light shining through the test field onto the camera may be determined. The term "translucent" as used herein is a broad term and is to be given its ordinary and customary meaning to a person of ordinary skill in the art and is not to be limited to a special or customized meaning. The term specifically may refer, without limitation, to a characteristic or property of an arbitrary object permitting light, specifically incident light, to pass through the object. Wherein a translucent object generally may transmit light, thus permitting more than 0% of light to pass through, the translucent object further may not transmit incident or ambient light completely, thus permitting less than 100% of light to pass through. As an example, the translucent test field may permit a restricted amount of light to pass through the test field. Specifically, incident or ambient light, e.g., incoming light shining onto the test field, may be at least partially transmitted by the test field. In particular, the test field may, for example, transmit up to 60% of incident light. Preferably the test field may transmit up to 40% of incident light. More preferably, the test field may transmit up to 30% of incident light. Specifically, the test field may, for example, transmit from 1% to 60% of incident light, preferably from 1% to 40% of incident light, more preferably from 1% to 30% of incident light. The transmission, however, may depend on the spectral properties of the incident light. Further, the transmission may specifically depend on a state or condition of the test field, such as for example on a dry or wet state of the test field. Thus, the transmission may particularly be dependent on a wetting condition, a moisture condition or a dampness condition of the test field, specifically a wetting of the test field by the sample. As an example, the test field in a dry condition may specifically show a higher transmittance of incident light, than, for example, the same test field in a damp or wetted condition, such as the test field having the sample applied thereto. The above-mentioned transmission values, as an example, may be given for at least one wavelength within the visible spectral range.

The test strip may for example further comprise a reference field. In particular, at least part of the reference field may, for example, be comprised by the region of the test strip, specifically by the region of the test strip comprising at least part of the test field. Thus, the reference field and the test field may specifically be arranged at a close distance, such as for example next to each other.

Further, the reference field may be opaque. Specifically, the term "opaque" may, without limitation, refer to a characteristic or property of an arbitrary object not permitting light to pass through the object. In particular, the opaque reference field may be configured to not transmit incident or ambient light through the reference field. As an example, the reference field may transmit less than 3%, preferably less than 2%, more preferably less than 1% of ambient light through the reference field. Specifically, the reference field may, for example, be 100% opaque. Thus, the reference field, as an example, may transmit 0% of incident or ambient light through the reference field.

Step d) of the detection method may further comprise substep d4) of capturing at least one image of the reference field. In addition, the image of the reference field may, for example, be taken into account for step e).

The reference field, for example, may contain at least one white field. In particular, the white field, specifically the white field comprised by the reference field, may, for example, be used for calibrating the camera, such as for setting a white balance of the camera.

The detection method may further comprise at least one step of checking camera-specific properties. For example, the camera-specific transformation function may be determined in the step of checking the camera-specific properties. Other camera-specific properties such as color authenticity may also be checked in said step.

In a further aspect a computer program comprising program means for fully or partially performing the detection method is disclosed. Thus, specifically, step d), step e) and optionally step f) of the detection method may be performed by the computer program. In particular, the computer program comprises program means, such as computer executable instructions for fully or partially performing the detection method while the computer program is being executed on a computer or on a computer network, such as, for example, on a processor of the mobile device. Specifically, the computer may fully or partially be integrated into the mobile device, and the computer program specifically may be embodied as a software app. In particular, the computer program may be stored on a computer-readable data carrier, such as, for example, on a memory or data storage of the mobile device. Alternatively, however, at least part of the computer may also be located outside of the mobile device.

Further disclosed and proposed herein is a data carrier having a data structure stored thereon, which, after loading into a computer or computer network, such as into a working memory or main memory of the computer or computer network, may execute the detection method according to one or more of the embodiments disclosed herein, e.g., steps d) and e) and optionally f), including possible substeps.

Further disclosed and proposed herein is a computer program product with program code means stored on a machine-readable carrier, in order to perform the method according to one or more of the embodiments disclosed herein, when the program is executed on a computer or computer network, e.g., steps d) and e) and optionally f), including possible substeps. As used herein, a computer program product refers to the program as a tradable product. The product may generally exist in an arbitrary format, such as in a paper format, or on a computer-readable data carrier. Specifically, the computer program product may be distributed over a data network.

Finally, disclosed and proposed herein is a modulated data signal which contains instructions readable by a computer system or computer network, for performing the detection method according to one or more of the embodiments disclosed herein, specifically one or more steps of the detection method as mentioned above or as further described below, e.g., steps d) and e) and optionally f), including possible substeps.

Specifically, further disclosed herein are:

a computer or computer network comprising at least one processor, wherein the processor is adapted to perform the detection method according to one of the embodiments described in this description, e.g., steps d) and e) and optionally f), including possible substeps, a computer loadable data structure that is adapted to perform the detection method according to one of the embodiments described in this description while the data structure is being executed on a computer, e.g., steps d) and e) and optionally f), including possible substeps, a computer program, wherein the computer program is adapted to perform the detection method according to one of the embodiments described in this description while the program is being executed on a computer, e.g., steps d) and e) and optionally f), including possible substeps, a computer program comprising program means for performing the detection method according to one of the embodiments described in this description while the computer program is being executed on a computer or on a computer network, e.g., steps d) and e) and optionally f), including possible substeps, a computer program comprising program means according to the preceding embodiment, wherein the program means are stored on a storage medium readable to a computer, e.g., steps d) and e) and optionally f), including possible substeps, a storage medium, wherein a data structure is stored on the storage medium and wherein the data structure is adapted to perform the detection method according to one of the embodiments described in this description after having been loaded into a main and/or working storage of a computer or of a computer network, e.g., steps d) and e) and optionally f), including possible substeps, and a computer program product having program code, wherein the program code can be stored or is stored on a storage medium, for performing the detection method according to one of the embodiments described in this description, if the program code is executed on a computer or on a computer network, e.g., steps d) and e) and optionally f), including possible substeps.

In a further aspect of the present disclosure, a mobile device is disclosed. The mobile device comprises:

I) at least one camera;
II) at least one illumination source; and
III) at least one processor.

The mobile device is configured for performing the detection method as described herein, e.g., according to any one of the embodiments described above and/or described in further detail below, in conjunction with a test strip having at least one test field, wherein the test field comprises at least one test chemical for performing an optical detection reaction in the presence of the analyte.

For most of the terms used herein and for possible definitions, reference may be made to the description of the detection method given above or as further described below.

As an example, the processor may comprise program means for fully or partially performing the detection method as disclosed above or as further disclosed below. Specifically, the program means may be configured for performing steps d), e) and optionally f) of the detection method.

In a further aspect a kit for detecting at least one analyte in at least one sample is disclosed. The kit comprises the mobile device according to the present disclosure and at least one test strip having at least one test field, the test field comprising at least one test chemical for performing an optical detection reaction in the presence of the analyte.

For most of the terms used herein and for possible definitions, reference may be made to the description of the detection method and/or the description of the mobile device given above or as further described below.

Further, the kit may comprise at least one holder for positioning the test strip relative to the mobile device, wherein the test strip may be positioned by the holder with the test field at a distance from the camera, wherein the camera may be on a first side of the test field and wherein the sample may be applicable from a second side opposing the first side.

Additionally, the holder may be open towards the second side, such that the test field may be uncovered on the second side. Specifically, the holder may be configured for leaving the second side of the test field uncovered, in order for the sample to be applicable to the second side of the test field, without interference of the holder.

In particular, the holder with the test strip and the mobile device may constitute an inner space. The space, for example, may be enclosed by the mobile device, the holder and the test strip. Specifically, the holder, the test strip and the mobile device may be arranged such that the inner space may be constituted. Further, the camera and the illumination source may face the inner space. In particular, the holder may position the test strip such that the illumination source may be capable of illuminating the test field.

The method and devices according to the present disclosure may provide a large number of advantages over known methods and devices for analytical measurements. The present disclosure may improve reliability and user-friendliness of the process of detecting an analyte in a sample, compared to processes known from the art. Specifically, the present disclosure may improve the reliability and user-friendliness of an application, e.g., an app, including computer-executable instructions for detecting an analyte in a sample, compared to known apps or computer programs. In particular, the present disclosure may ensure a robust detection of the analyte in varying or non-stable imaging conditions. Specifically, the disclosure may provide an improved reliability and accuracy of the apps or computer programs using the mobile device's camera images because an impact of ambient light is taken into account when determining the result, specifically when detecting the analyte in the sample.

Summarizing and without excluding further possible embodiments, the following embodiments may be envisaged:

Embodiment 1: A detection method for detecting at least one analyte in at least one sample, the method comprising:

a) providing at least one mobile device having at least one camera and at least one illumination source;
b) providing at least one test strip having at least one test field, the test field comprising at least one test chemical for performing an optical detection reaction in the presence of the analyte;
c) applying the at least one sample to the test field;
d) capturing a plurality of images of at least one region of the test strip, the region comprising at least a part of the test field to which the sample is applied, comprising
   d1) capturing at least one image before applying the sample to the test field, with the illumination source turned off,
   d2) capturing at least one image before applying the sample to the test field, with the illumination source turned on; and
   d3) capturing at least one image after applying the sample to the test field;
e) determining a concentration of the analyte in the sample by using the images captured in step d).

Embodiment 2: The method according to the preceding embodiment, further comprising:
f) comparing corresponding images captured in step d) with the illumination source turned on and off, and determining differences in light intensities.

Embodiment 3: The method according to the preceding embodiment, wherein step e) comprises using the result of step f) for determining the concentration of the analyte in the sample.

Embodiment 4: The method according to any one of the two preceding embodiments, wherein step f) comprises:
   f1) deriving at least one item of color information of the part of the test field to which the sample is applied for each image to be compared;
   f2) transforming the item of color information into at least one item of the light intensity information by using at least one camera-specific transmission function;
   f3) determining the differences in light intensities by using the items of light intensity information of corresponding images with the illumination source turned on and off.

Embodiment 5: The method according to the two preceding embodiments, wherein, for step e), differences in light intensities are transformed into differences in items of color information for corresponding images by using an inverted function of the camera-specific transmission function.

Embodiment 6: The method according to any one of the two preceding embodiments, wherein the camera-specific transmission function is a non-linear function transforming the item of color information into the item of light intensity information.

Embodiment 7: The method according to any one of the three preceding embodiments, wherein the camera-specific transformation function is one or more of a non-linear light intensity transmission function and a non-linear exposure level sensitivity function.

Embodiment 8: The method according to any one of the preceding embodiments, wherein step d3 comprises:
   d3i) capturing at least one image with the illumination source turned off, and
   d3ii) capturing at least one image with the illumination source turned on.

Embodiment 9: The method according to the preceding embodiment, wherein step e) further comprises using a difference in light intensities between images captured in d3i) and d3ii).

Embodiment 10: The method according to any one of the preceding embodiments, wherein one or more of steps d1) to d3) are performed repeatedly.

Embodiment 11: The method according to the preceding embodiment, wherein a kinetic measurement curve of the optical detection reaction is monitored.

Embodiment 12: The method according to any one of the preceding embodiments, wherein, in step c), the sample is applied to the test field from a side opposing the camera.

Embodiment 13: The method according to the preceding embodiment, wherein a holder is used for positioning the test strip relative to the mobile device, wherein the test strip is positioned with the test field at a distance from the camera, wherein the camera is on a first side of the test field and wherein the sample is applied from a second side opposing the first side.

Embodiment 14: The method according to the preceding embodiment, wherein the holder is open towards the second side, such that the test field is uncovered on the second side.

Embodiment 15: The method according to any one of the two preceding embodiments, wherein the holder comprises an opening, such that the test field is uncovered on the first side.

Embodiment 16: The method according to any one of the preceding embodiments, wherein the test field is at least partially translucent, wherein, in step e), a contribution of ambient light shining through the test field onto the camera is determined.

Embodiment 17: The method according to any one of the preceding embodiments, wherein the test strip further comprises a reference field, wherein the region of the test strip further comprises at least a part of the reference field.

Embodiment 18: The method according to the preceding embodiment, wherein the reference field is opaque.

Embodiment 19: The method according to any one of the two preceding embodiments, wherein method step d) further comprises: d4) capturing at least one image of the reference field.

Embodiment 20: The method according to the preceding embodiment, wherein the image of the reference field is taken into account for step e).

Embodiment 21: The method according to any one of the three preceding embodiments, wherein the reference field contains at least one white field.

Embodiment 22: The method according to any one of the preceding embodiments, wherein the method further comprises at least one step of checking camera-specific properties.

Embodiment 23: A computer program comprising program means for fully or partially performing the method according to any one of the preceding embodiments, specifically for performing steps d), e) and optionally f) of the method, while the computer program is being executed on a computer or on a computer network, specifically on a processor of the mobile device.

Embodiment 24: A mobile device, comprising:
I) at least one camera;
II) at least one illumination source; and
III) at least one processor,
wherein the mobile device is configured for performing the detection method for detecting the at least one analyte in the at least one sample according to any one of the preceding embodiments in conjunction with a test strip having at least one test field, the test field comprising at least one test chemical for performing an optical detection reaction in the presence of the analyte.

Embodiment 25: The mobile device according to the preceding embodiment, wherein the processor comprises program means for fully or partially performing the method according to any one of the preceding embodiments referring to a method, specifically for performing steps d), e) and optionally f) of the method.

Embodiment 26: A kit for detecting at least one analyte in at least one sample, the kit comprising the mobile device according to any one of the preceding embodiments referring to a mobile device, the kit further comprising at least one test strip having at least one test field, the test field comprising at least one test chemical for performing an optical detection reaction in the presence of the analyte.

Embodiment 27: The kit according to the preceding embodiment, the kit further comprising at least one holder for positioning the test strip relative to the mobile device, wherein the test strip is positioned by the holder with the test field at a distance from the camera, wherein the camera is on a first side of the test field and wherein the sample is applicable from a second side opposing the first side.

Embodiment 28: The kit according to the preceding embodiment, wherein the holder is open towards the second side, such that the test field is uncovered on the second side.

Embodiment 29: The kit according to any one of the two preceding embodiments, wherein the holder with the test strip and the mobile device constitutes an inner space, the space being enclosed by the mobile device, the holder and the test strip.

Embodiment 30: The kit according to the preceding embodiment, wherein the camera and the illumination source face the inner space.

Embodiment 31: The kit according to any one of the preceding embodiments referring to a kit, wherein the holder positions the test strip such that the illumination source is capable of illuminating the test field.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
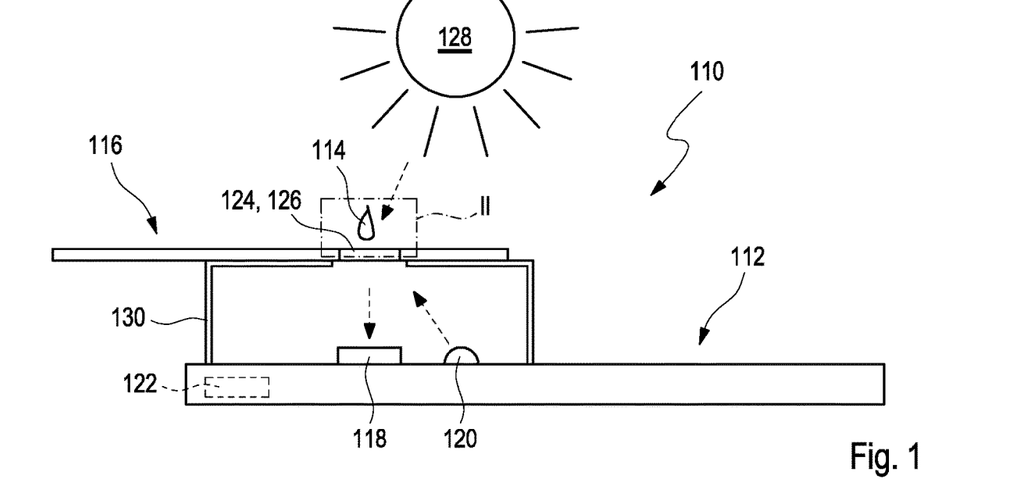
FIG. 1 shows a side view of an embodiment of a kit comprising a mobile device for performing a detection method according to the present disclosure.

In FIG. 1, a side view of an embodiment of a kit 110 for detecting at least one analyte in at least one sample 114 comprising a mobile device 112 and a test strip 116 is illustrated. The mobile device 112, as shown in FIG. 1, comprises at least one camera 118, at least one illumination source 120 and at least one processor 122. The test strip 116 comprises at least one test field 124, comprising at least one test chemical 126 for performing an optical detection reaction in the presence of the analyte. Further, three examples of rays of light may be illustrated in FIG. 1 by three dashed arrows. A first dashed arrow may indicate ambient or incident light shining from an arbitrary ambient light source 128, such as the sun, a lamp or any other light source, onto a test field 124. A second dashed arrow may indicate light emitted by the illumination source 120 when the illumination source 120 is turned on. Thus, the second dashed arrow may indicate light only present in case the illumination source 120 is turned on. In case the illumination source 120 is turned off, no light may be emitted from the illumination source 120 of the mobile device 112. A third dashed arrow may indicate light shining onto the camera 118. Specifically, in case the illumination source 120 is turned off, the light shining onto the camera 118, e.g., the light indicated by the third dashed arrow, may comprise ambient or incident light transmitted through the test strip 116, for example through the test field 124, onto the camera 118. Alternatively, in case the illumination source 120 is turned on, the light shining onto the camera 118, e.g., the light indicated by the third dashed arrow, may comprise ambient or incident light transmitted through the test strip 116 as well as light emitted from the illumination source 120. In particular, in case the illumination source 120 is turned on, the light shining onto the camera 118 may for example be reflected by the test strip 116, such as for example by the test field 124, and/or by a holder 130, wherein the holder 130 may be comprised by the kit 110.

Figure 2:
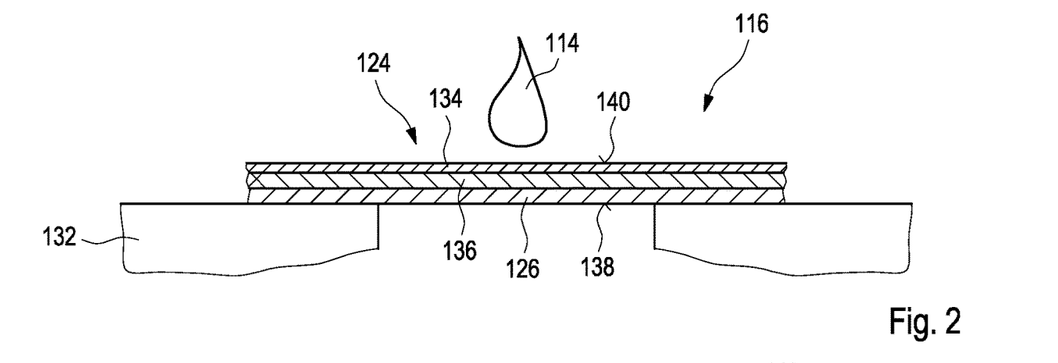
FIG. 2 shows an enlarged sectional view of the embodiment of the kit illustrated in FIG. 1.

In FIG. 2, an enlarged sectional view of the embodiment of the kit 110 as illustrated in FIG. 1 is shown. In particular, the test strip 116 having the test field 124, the test field 124 comprising the at least one test chemical 126, is shown. As an example, the test strip 116 may comprise a substrate or carrier 132, wherein the test field 124, as an example, may be applied to the carrier 132. The test field 124, as illustrated in FIG. 2, may for example comprise multiple layers such as, for example, a wetting layer 134 for equally spreading the sample 114, a filter layer 136 for filtering or separating sample 114 components for a subsequent color-change detection reaction which may be performed by the test chemical 126. Other structures or layer build-up may be feasible. As an example, the test chemical 126 may be arranged such that the color-change may be identifiable on a first side 138 of the test field 124. In particular, the first side 138 may be arranged opposing a second side 140 of the test field 124, wherein the sample 114 may be applied to the second side 140 of the test field 124. Specifically, the camera 118 may be arranged such as to face the first side 138 of the test field 124.

Figure 3:
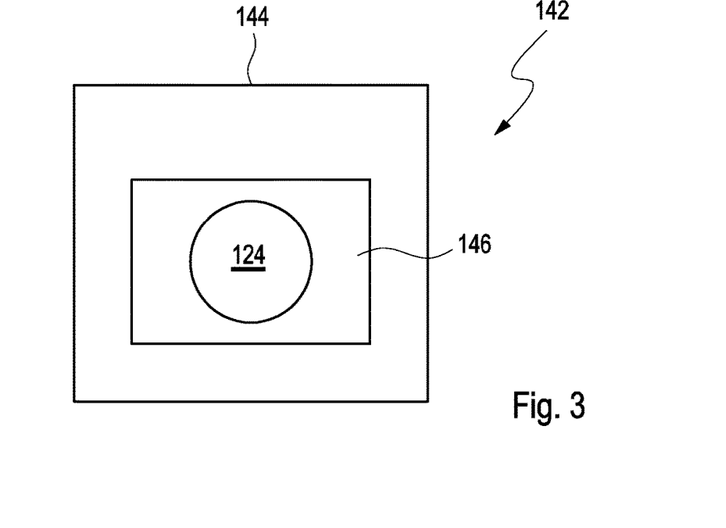
FIG. 3 shows an embodiment of an image captured by the camera of the mobile device.

FIG. 3 illustrates an embodiment of an image 142 captured by the camera 118 of the mobile device 112. The image 142, as an example, may be of at least one region 144 of the test strip 116 comprising at least a part of the test field 124, wherein the test field 124 for example may be translucent. As an example, the region 144 may further fully or partially comprise a reference field 146, wherein the reference field 146, as an example, may be opaque and may contain at least one white field.

Figure 4:
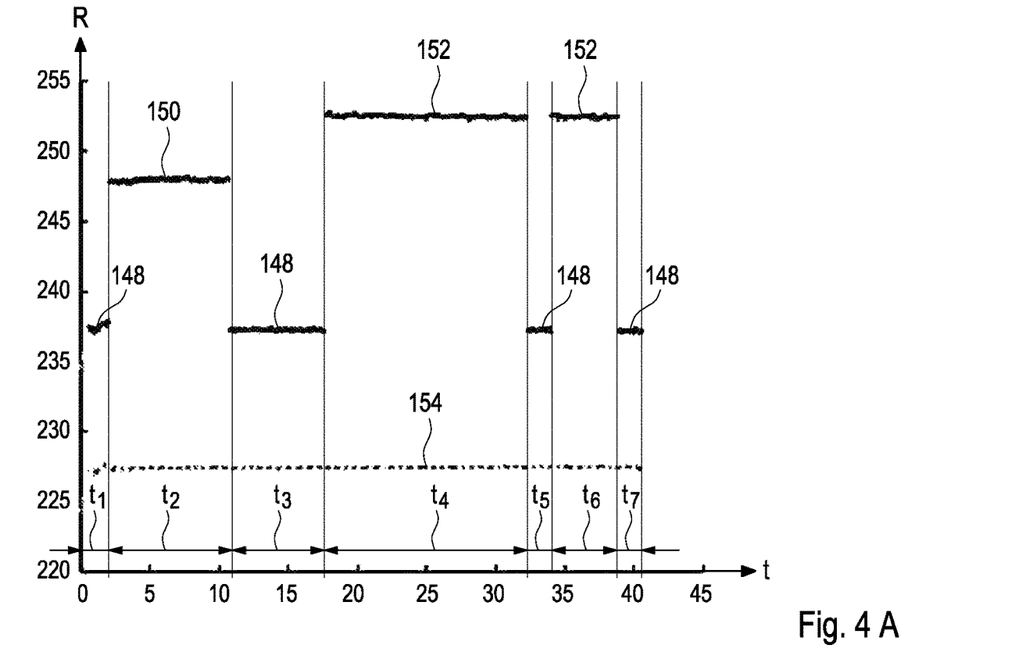
FIGS. 4A and 4B show embodiments of graphs of an influence of ambient light on a color of a test field and a reference field.

In FIGS. 4A and 4B, embodiments of graphs of an influence of ambient light on a color of the test field 124 and the reference field 146, are illustrated. In the graphs, the x-axis may indicate the time t, for example measured in seconds, and the y-axis may indicate a color or reflectivity R. The graph in FIG. 4A illustrates an influence of ambient light on a determined color or reflectivity of the test field 124 and on a determined color of the reference field 146. In particular, determined colors or reflectivities R of the test field 124, illustrated in a solid line, and the reference field 146, illustrated in a dotted line, are shown for three different illumination conditions over time. As an example, in a first illumination condition the ambient light source 128 may be turned off and the illumination source 120 of the mobile device 112 may be turned on. Specifically, in the graph, the first illumination condition may be used in the time frames $t_1$, $t_3$, $t_5$ and $t_7$ wherein $t_1 = 0 \leq t < 2$ s, $t_3 = 11 \leq t < 18$ s, $t_5 = 32 \leq t < 34$ and $t_7 = 39 \leq t < 41$ s. In a second and third illumination condition both the illumination source 120 of the mobile device 112 and the ambient light source 128 may be turned on. However, in the third illumination condition the ambient light may have a higher level of brightness than in the second illumination condition. Specifically, in the graph, the second illumination condition may be used in the time frame $t_2$, wherein $t_2 = 2 \leq t < 11$ s and the third illumination condition may be used in the time frames $t_4$ and $t_6$, wherein $t_4 = 18 \leq t < 32$ and $t_6 = 34 \leq t < 39$ s. In the graph, as illustrated in FIG. 4A, the test field 124 shows a different color, e.g., a different color coordinate value, a different color-specific intensity or a different intensity in a specific spectral color range, or reflectivity for each of the three illumination conditions. In particular, the determined first color 148 of the test field 124 for the first illumination condition may be less bright than the determined second color 150 of the test field 124 for the second illumination condition and the determined third color 152 of the test field 124 for the third illumination condition. Additionally, the determined third color 152 of the test field 124 may be brighter than the determined second color 150. Thus, the illumination condition may have a direct impact on the determined color of the test field 124. However, a determined color 154 of the reference field 126 may be independent of the illumination condition, as can be seen in the graph illustrated in FIG. 4A.

It may be noted that given time specifications, such as for example the specific times of the time frames, as stated in the description of the figures are given for exemplary purpose and thus serve to illustrate possible embodiments and are not to be construed as limiting the scope thereof.

The graph in FIG. 4B illustrates an influence of a combination of ambient light and of the illumination source 120 being turned on or off and of the sample 114 being or not being applied to the test field 124, on a determined color of the test field 124 and on a determined color of the reference field 146. In particular, determined colors or reflectivities R of the test field 124, illustrated in the solid line, and of the reference field 146, illustrated in the dotted line, are shown for different conditions of illumination and of the sample 114 being or not being applied to the test field 124. Specifically, in the graph, the sample 114 is not applied to the test field 124 during the time $0 \leq t < 32$ s. Subsequently, during the time $32 \leq t < 38$ s the sample 114 is being applied to the test field 124 and the color-change detection reaction may be performed by the test chemical 126. During the subsequent time $38 \leq t < 86$ s the sample is applied to the test field 124 and the color-change detection reaction may already be terminated. As an example, the sample application may take place within a time frame of one second or less. The sample may penetrate the test chemical 126, and the color change detection reaction, having its characteristic reaction kinetics, may take place. In FIG. 4B, again three different illumination conditions may be used, wherein the illumination conditions used in FIG. 4B differ from the illumination conditions used in FIG. 4A.

In particular, in the first illumination condition used in FIG. 4B the illumination source 120 of the mobile device 112 is turned on and the ambient light source 128 is also turned on, wherein in this graph the ambient light source 128 may only be able to adapt the two stages "on" and "off." The first illumination condition used in FIG. 4B may be used in the time frames $t_1'$, $t_4'$ and $t_7'$, wherein $t_1'=0 \leq t < 5$ s, $t_4'=16 \leq t < 58$ s and $t_7'=75 \leq t < 82$ s. In the second illumination condition the illumination source 120 is turned off whereas the ambient light source 128 is turned on. The second illumination condition may specifically be used in the time frames $t_2'$, $t_5'$ and $t_8'$, wherein $t_2'=5 \leq t < 13$ s, $t_5'=58 \leq t < 68$ s and $t_7'=75 \leq t < 82$ s. In the third illumination condition the illumination source 120 is turned on whereas the ambient light source 128 is turned off. The third illumination condition may specifically be used in the time frames $t_3'$ and $t_6'$, wherein $t_3'=13 \leq t < 16$ s and $t_6'=68 \leq t < 75$ s.

As can be seen in FIG. 4B, the determined first color 156, such as a first color coordinate value, a first color-specific intensity or an intensity in a first specific spectral color range, of the reference field 146 may essentially be the same for the first illumination condition and the third illumination condition. Thus, for example, only the illumination source 120, e.g., being switched on or off, may have an impact on the determined color of the reference field 146. Specifically, as illustrated in FIG. 4B, the determined second color 158 of the reference field 146, e.g., determined in the time frames during which the illumination source 120 is turned off, may for example show a color or reflectivity of R=0. However, the determined color of the test field 124, as illustrated in the graph, may show a significant dependency on the illumination condition as well as on the application of the sample 114. Specifically, the determined colors of the test field 124 may differ from each other for each illumination condition. Further, the determined color of the test field 124 may be different whether the sample 114 is applied to the test field 124 or not, even for the same illumination condition. In particular, a determined first color 160 of the test field 124 for the first illumination condition may be brighter before applying the sample 114 to the test field 124 than after applying the sample 114. As an example, a translucency of the test field 124 may be lessened due to the sample 114 being applied to the test field 124, thus a smaller amount of light may be transmitted through the test field 124 onto the camera 118, which may result in a color transition 159. Specifically, the color transition 159 may lead to a less bright determined first color 160 of the test field 124 under the same first illumination condition after the sample 114 is applied to the test field 124 than before. Further, as illustrated in the FIG. 4B, the determined second color 162 as well as the determined third color 164 of the test field 124 both differ from each other and from the first color 160, and in addition, the second color 162 and the third color 164 also change in brightness due to the application of the sample 114 to the test field 124.

Figure 5:
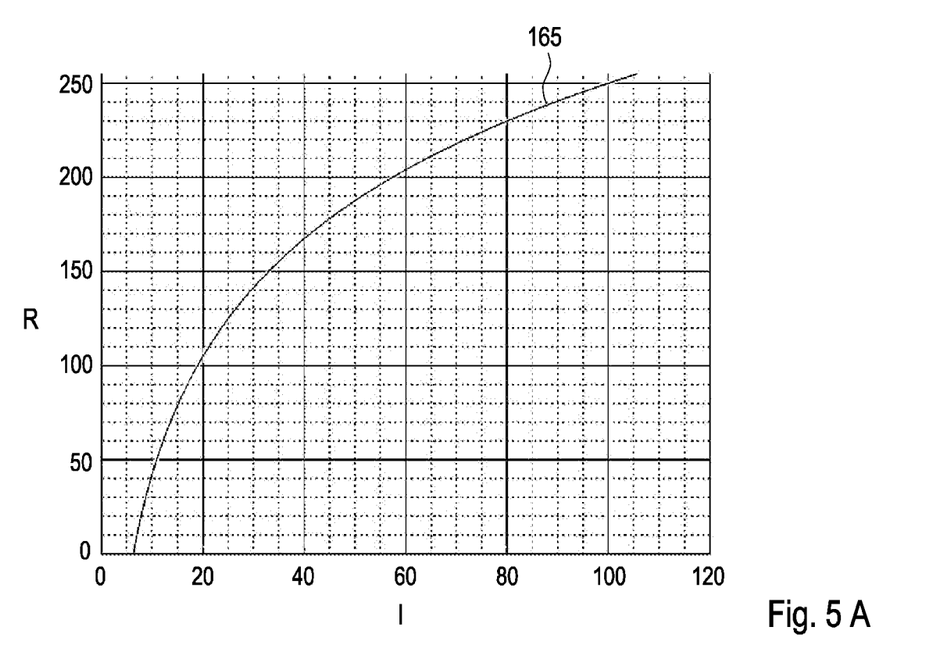
FIGS. 5A and 5B show embodiments of a graph of a camera-specific transmission function.

In FIGS. 5A and 5B, embodiments of a graph of a camera-specific transmission function 165 are shown. Specifically, in the graphs, an exposure level or light intensity I, specifically an intensity of incoming light, may be illustrated on the x-axis and a corresponding color or reflectivity R, specifically a value of a color channel of a determined color, e.g., from one or more of R, G and B, may be illustrated on the y-axis. As an example, FIGS. 5A and 5B may show the same camera-specific transmission function 165. However, in FIG. 5A the x-axis may show a light intensity I in a linear scale of values of the light intensity in an arbitrary unit, wherein in FIG. 5B a logarithmic scale may be used to illustrate the light intensity I. In particular, as an example, the camera-specific transmission function 165 illustrated in the graphs may be mathematically described as $$R(I) = 62.5 \log 2I - 165.24. \quad (1)$$

As an example, an inverse function of the non-linear function (2) may be mathematically described as $$I(R) = 2^{\left(\frac{R+165.24}{62.5}\right)}. \quad (2)$$

Figure 6:
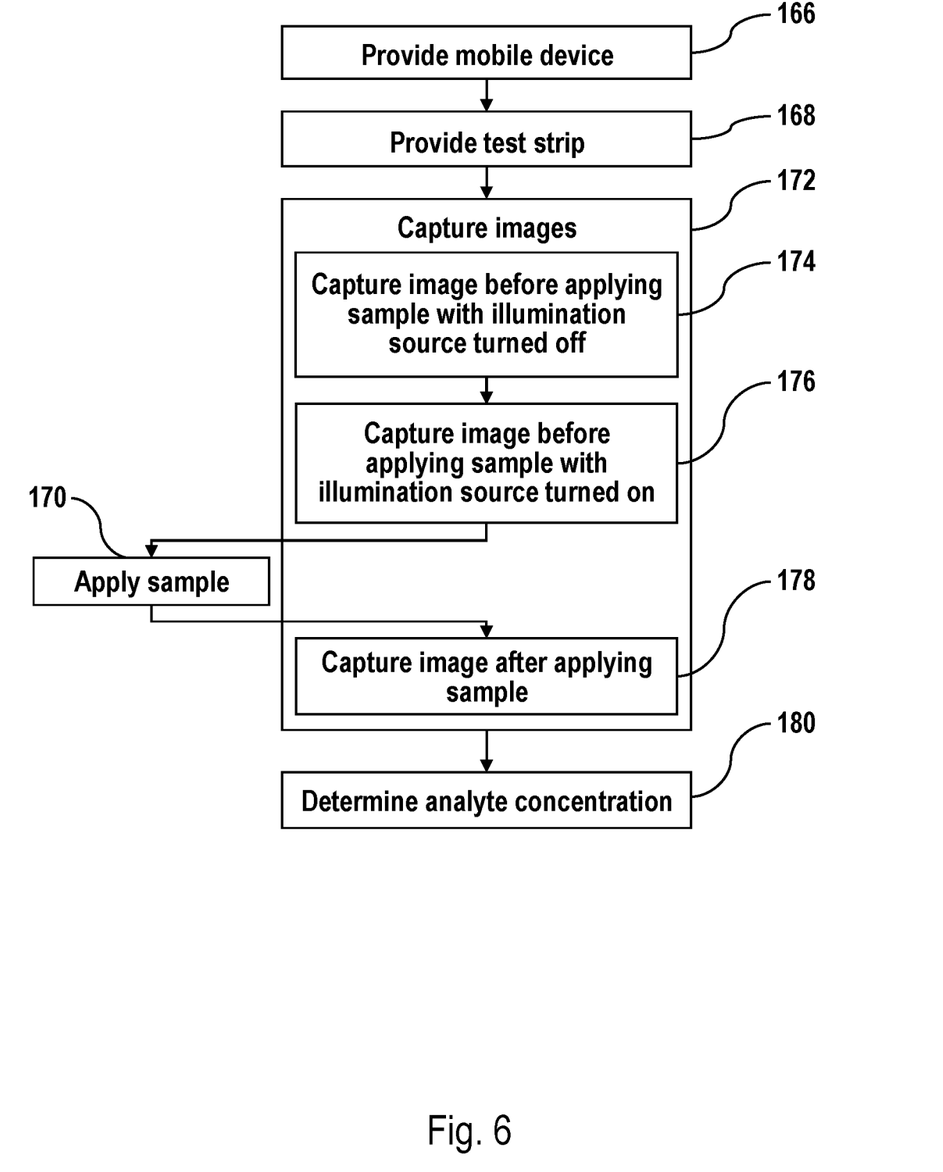
FIGS. 6 and 7 show embodiments of flow charts of an embodiment of a detection method.
Figure 7:
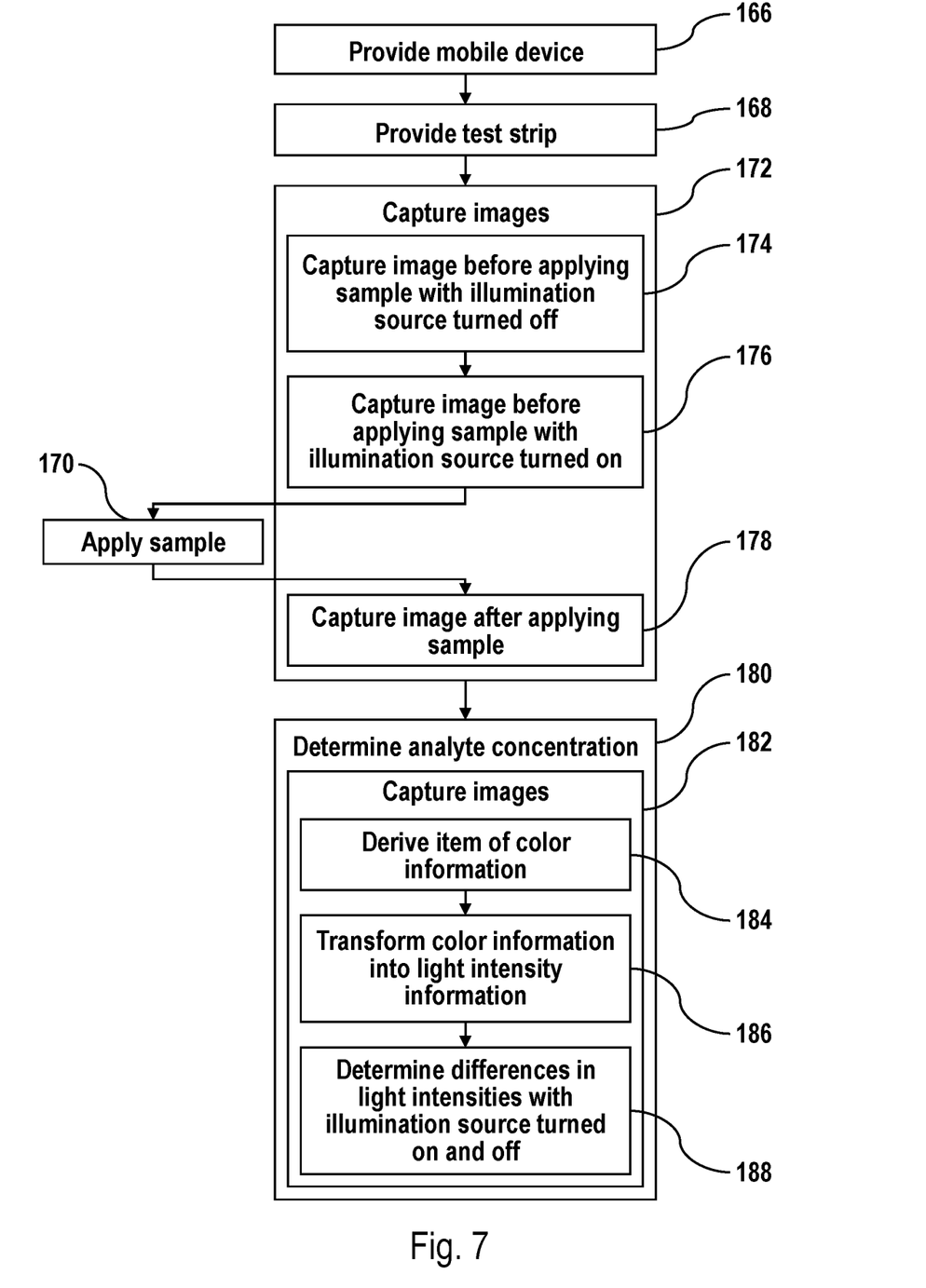

In FIGS. 6 and 7 flow charts of a detection method for detecting at least one analyte in at least one sample 114 is illustrated. The detection method comprises step a) (denoted with reference number 166) of providing at least one mobile device 112 having at least one camera 118 and at least one illumination source 120. As an example, the mobile device 112 as illustrated in FIG. 1 may be provided. Further, the detection method comprises step b) (denoted with reference number 168) of providing at least one test strip 116 having at least one test field 124, the test field 124 comprising at least one test chemical 126 for performing an optical detection reaction in the presence of the analyte. In particular, as an example, the test strip 116 illustrated in FIG. 1 may be provided. Furthermore, the detection method may comprise step c) (denoted with reference number 170) of applying the at least one sample 114 to the test field 124. As an example, step c) may be performed by way of dropping the sample 114 onto the test field 124, as illustrated in FIGS. 1 and 2.

Further, the detection method comprises step d) (denoted with reference number 172) of capturing a plurality of images 142 of at least one region 144 of the test strip 116, the region 144 comprising at least a part of the test field 124 to which the sample 114 is applied. The method step d) further at least comprises the following substeps:
- d1) (denoted with reference number 174) capturing at least one image 142 before applying the sample 114 to the test field 124, with the illumination source 120 turned off,
- d2) (denoted with reference number 176) capturing at least one image 142 before applying the sample 114 to the test field 124, with the illumination source 120 turned on; and
- d3) (denoted with reference number 178) capturing at least one image 142 after applying the sample 114 to the test field 124.

In particular, substep d1) may for example be performed in the time frame $t_2'$ of the graph illustrated in FIG. 4B. Further, substep d2) may, as an example, be performed in one or both of the time frames $t_1'$ and $t_3'$. It may also be possible to perform substep d2) at the beginning of the time frame $t_4'$, e.g., during $16 \leq t < 32$ s, for example before performing step e) of applying the sample 114 to the test field 124, e.g., during $32 \leq t < 38$ s. Further, substep d3) may specifically be performed after applying the sample 114 to the test field 124, such as, for example, at the end of the time frame $t_4'$, e.g., during $38 \leq t < 58$ s, and/or time frames $t_5'$, $t_6'$, $t_7'$ and $t_8'$.

The detection method further comprises step e) (denoted with reference number 180) of determining a concentration of the analyte in the sample 114 by using the images 142 captured in step d). As illustrated in FIG. 7, the detection method may further comprise step f) (denoted with reference number 182) of comparing corresponding images captured in step d) with the illumination source 120 turned on and off, and determining differences in light intensities. The result of step f) may for example be used for determining the concentration of the analyte in the sample 114, thus as an example step e) may comprise step f), as illustrated in FIG. 7.

As further illustrated in FIG. 7, step f) may for example comprise the following substeps:

f1) (denoted with reference number 184) deriving at least one item of color information of the part of the test field to which the sample is applied for each image to be compared;

f2) (denoted with reference number 186) transforming the item of color information into at least one item of the light intensity information by using at least one camera-specific transmission function 165;

f3) (denoted with reference number 188) determining the differences in light intensities by using the items of light intensity information of corresponding images with the illumination source turned on and off.

As an example, the camera-specific transmission function 165, which may be used in substep f2) may for example be illustrated in FIGS. 5A and B. Thus, in the following, an exemplary calculation is shown, which may be performed in the detection method. The image 142 captured in step d1) may for example show a color or reflectivity of $R_{d1}=230$ and the image 142 captured in step d2) may for example show a color or reflectivity of $R_{d2}=80$. As an example, $R_{d1}$ and $R_{d2}$ may be comprised by the item of color information derived in step f1). As an example, in step f2), the inverse camera-specific transmission function (2) may be used for transforming $R_{d1}$ and $R_{d2}$ into light intensities $I_{d1}=80$ and $I_{d2}=15$. Subsequently, a difference in the light intensities may be determined in step f3), such as for example $I_{d12}=80-15=65$. In particular, for step e), differences in light intensities, as an example, may be transformed into differences in items of color information for corresponding images by using the inverted function (2) of the camera-specific transmission function (1). Thus, as an example $R_{d12}(I_{d12}=65)=211$ may be calculated. In particular, the differences in items of color information, e.g., $R_{d12}$, may for example comprise information on a true color of the test field, such as for example the color of the reference field without interference of external or ambient light, before the sample 114 may be applied to the test field 124.

After applying the sample 114 to the test field, e.g., after performing step c), step d3) may be performed. In particular, step d3) may for example comprise substep d3i) (denoted with reference number 190) of capturing at least one image 142 with the illumination source 120 turned off, and substep d3ii) (denoted with reference number 192) of capturing at least one image 142 with the illumination source 120 turned on. As an example, the images 142 captured in step d3) may show a color or reflectivity of $R_{d3i}=190$ and $R_{d3ii}=15$. As an example, $R_{d3i}$ and $R_{d3ii}$ may be comprised by the item of color information derived in step f1). Again, as an example, using the inverted function (2) of the camera-specific transmission function (1), corresponding light intensities $I_{d3i}=51$ and $I_{d3ii}=7$, may be determined, e.g., in step f2), leading to a difference in light intensities $I_{d3}=44$. Subsequently, as an example, $R_{d3}(I_{d3}=44)=176$, may be calculated. $R_{d3}$ may for example comprise information on a true color of the test field 124, after the color-change detection reaction is performed by the test chemical 126. Thus, a change of color, specifically a difference in the color due to the concentration of the analyte in the sample 114 independent of incident or ambient light, may for example be determined from a difference between $R_{d12}$ and $R_{d3}$.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS

110 Kit
112 Sample
114 mobile device
116 test strip
118 camera
120 illumination source
122 processor
124 test field
126 test chemical
128 ambient light source
130 holder
132 carrier
134 wetting layer
136 filter layer
138 first side
140 second side
142 image
144 region
146 reference field
148 first color of test field
150 second color of test field
152 third color of test field
154 color of reference field
156 first color of reference field
158 second color of reference field
159 color transition
160 first color of test field
162 second color of test field
164 third color of test field
165 camera-specific transmission function
166 step a)
168 step b)
170 step c)
172 step d)
174 step d1)
176 step d2)
178 step d3)
180 step e)
182 step f)
184 step f1)
186 step f2)
188 step f3)
190 step d3i)
192 step d3ii)

What is claimed is:

1. A method for detecting an analyte in a sample, comprising:

a) providing a mobile device having a camera, a processor and an illumination source;

b) providing a test strip comprising a test field having at least one test chemical for performing an optical detection reaction in the presence of the analyte;
c) applying the sample to the test field;
d) capturing a first image of a region of the test strip that includes at least a part of the test field to which the sample is applied, the first image being captured before step c) with the illumination source turned off;
e) capturing a second image of the region before step c) with the illumination source turned on;
f) capturing a third image of the region after step c) with the illumination source turned off;
g) capturing a fourth image of the region after step c) with the illumination source turned on;
wherein the processor of the mobile device is configured to perform steps of:
h) comparing corresponding images captured in steps d)-g) with the illumination source turned on and off, and determining differences in light intensities, step h) further comprising:
h1) deriving an item of color information of the part of the test field to which the sample is applied for each image to be compared;
h2) transforming the item of color information into an item of light intensity information by using at least one camera-specific transmission function;
h3) determining the differences in light intensities by using the items of light intensity information of corresponding images with the illumination source turned on and off;
i) determining the concentration of the analyte in the sample using the images captured in steps d)-g) and the result of step h).

2. The method according to claim 1, wherein the differences in light intensities determined in step h) are transformed into differences in items of color information using an inverted function of a camera-specific transmission function, wherein the camera-specific transmission function is a non-linear function.

3. The method according to claim 1, wherein step i) comprises using a difference in light intensities between images captured in steps f) and g).

4. The method according to claim 1, wherein, in step c), the sample is applied to the test field from a side opposing the camera.

5. The method according to claim 4, further comprising using a holder to position the test strip relative to the mobile device, wherein the test strip is positioned with the test field at a distance from the camera, wherein the camera is on a first side of the test field and the sample is applied from a second side opposing the first side.

6. The method according to claim 5, wherein the holder is open towards the second side such that the test field is uncovered on the second side, wherein the holder comprises an opening such that the test field is uncovered on the first side.

7. The method according to claim 1, wherein the test field is at least partially translucent and, in step i), a contribution of ambient light shining through the test field onto the camera is determined.

8. The method according to claim 1, wherein the test strip further comprises an opaque reference field and the region includes at least a part of the reference field and the method further comprises capturing a reference field image and taking into account the reference field image in step i).

9. A mobile device for performing the method of claim 1, wherein:
the processor of the mobile device is configured to perform at least steps d)-i) according to claim 1 in cooperation with the camera and the illumination source of the mobile device.

10. A kit for detecting at least one analyte, comprising:
at least one test strip comprising a test field having at least one test chemical for performing an optical detection reaction in the presence of the analyte; and
the mobile device of claim 9.

11. The method according to claim 1, wherein the item of color information is a value for a color coordinate which undergoes a significant change during a color-change or color formation reaction of the test chemical.

12. The method according to claim 1, wherein the results of step h3) correspond to a difference in color due to the concentration of the analyte in the sample independent of incident or ambient light.

13. The method of claim 1, wherein the differences in light intensities determined in step h) are transformed into differences in items of color information using an inverted function of a camera-specific transmission function, wherein the camera-specific transmission function is determined by at least one calibration process.

14. The method of claim 6, wherein the test field is at least partially translucent and, in step i), a contribution of ambient light shining through the test field onto the camera is determined; and
the test further comprises an opaque reference field and the region includes at least a part of the reference field and the method further comprises capturing a reference field image and taking into account the reference field image in step i).

15. The mobile device of claim 9, wherein the mobile device further comprises computer executable instructions wherein the processor performs steps d)-i) by executing the computer executable instructions.

16. The method of claim 1 wherein step h) comprises evaluating raw pixel data using a demosaicing algorithm and/or a filtering algorithm.

17. The method of claim 1 wherein step h) comprises evaluating raw pixel data using a demosaicing algorithm.

18. The method of claim 1 wherein step h) comprises evaluating raw pixel data using a filtering algorithm.

19. The method of claim 2 wherein step h) comprises determining a difference in color due to the concentration of the analyte in the sample independent of incident or ambient light.

* * * * *